A. E. MILLER.
DEVICE OR APPLIANCE FOR CRANKING AUTOMOBILES.
APPLICATION FILED JUNE 14, 1916.
1,200,514.                                                                 Patented Oct. 10, 1916.
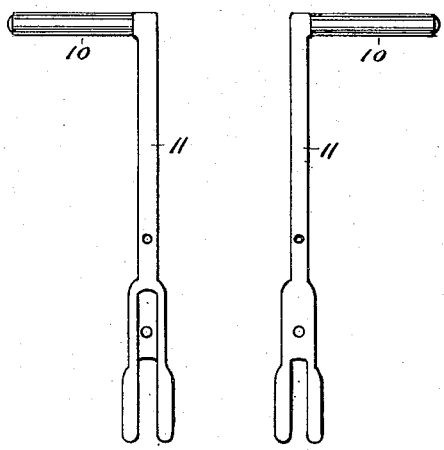
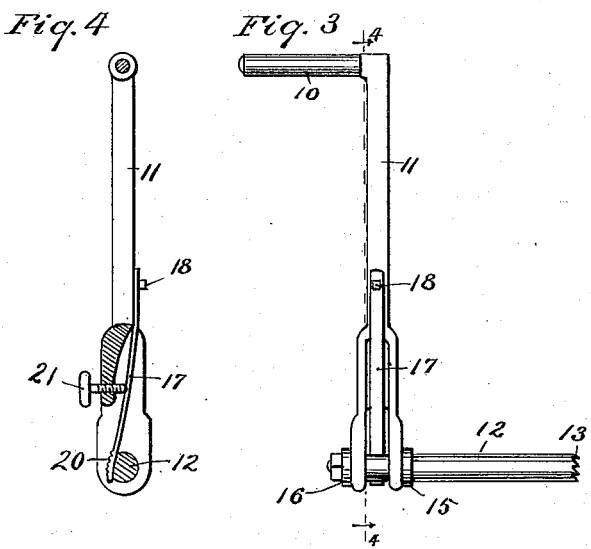
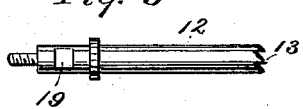
INVENTOR
Arthur E. Miller
BY
Delbert H Decker
ATTORNEY

UNITED STATES PATENT OFFICE.

ARTHUR E. MILLER, OF SACRAMENTO, CALIFORNIA.

DEVICE OR APPLIANCE FOR CRANKING AUTOMOBILES.

1,200,514.   Specification of Letters Patent.   Patented Oct. 10, 1916.

Application filed June 14, 1916.  Serial No. 103,673.

*To all whom it may concern:*

Be it known that I, ARTHUR E. MILLER, a citizen of the United States, residing at Sacramento, in the county of Sacramento and State of California, have invented certain new and useful Improvements in Devices or Appliances for Cranking Automobiles, of which the following is a specification.

This invention has for its purpose the elimination of the danger encountered in starting automobile engines by the hand cranks now in use which in cases of "backfiring" cause the breaking of bones or the straining of muscles and tendons. Such danger is eliminated by so constructing the starting crank that shocks of back-firing cannot be transmitted to the hand. To this end the starting crank, made similar to those now in use, has introduced therein a yielding or spring connection between the handle and the pin or socket by which engagement is effected with the engine shaft.

The invention therefore consists in the structure of parts and in their combination substantially as set forth herein and claimed.

In the accompanying drawing which forms a part of this specification Figures 1 and 2 represent respectively the opposite sides of the shank and handle of the improved starting crank; Fig. 3 is a side elevation of the complete starting crank in its preferred form; Fig. 4 is a partially sectionized front elevation of the said crank the section being taken in the plane indicated by line 4—4 in Fig. 3; Fig. 5 is a detail view of the pin of the starting crank; Fig. 6 is a transverse section through such pin showing a modification.

The starting crank as illustrated in the drawing has the handle 10, provided as usual with a grip sleeve, the shank 11 and the engaging pin 12 connected by said shank to the handle and provided with clutch teeth 13 at its free end. The engaging pin may be solid as in Figs. 3 and 5 or it may be in socket form depending upon the form of coacting member upon the engine shaft.

The interposition of the yielding or spring connection between handle 10 and pin 12 may be effected in various ways. In the way illustrated the shank 11 is bifurcated and journaled upon the end of pin 12 being confined thereon between a collar 15 and a nut and washer at 16. In the fork of the shank a plate spring 17 is located and held in place by a screw or bolt 18. The free end of this spring is located against a flattened side 19 of the pin 12 (Figs. 4–6). The free end of said spring may if desired be slightly curved (Fig. 4) at its bearing upon said flattened portion 19. The reverse side of the spring at that bearing portion may also be roughened or ridged as indicated at 20 and the flattened portion of the pin may be correspondingly roughened or ridged (19' Fig. 6) for firmer engagement with the spring, the spring having been reversed for such engagement. To regulate the engaging pressure of the spring a set screw 21 is placed in the shank 11 (Fig. 4) to bear upon said spring.

In the use of this improved crank the pressure between the spring 17 and pin 12 is made just sufficient to hold the shank against rotation on the pin in turning the engine shaft. This pressure however will yield to force suddenly applied to the pin as by back-fire of the engine thereby saving the arm of the one cranking up.

In the form of crank described the pin slips around under the spring 17 at the sudden shock of back-firing and so absorbs the shock while the teeth 13 are being thrown back from engagement with the co-acting member. Thus the resilient connection between handle and pin absorbs the shock of back-firing and so saves the wrist or arm of the starter and provides an interval for the automatic disengagement of the crank from its connection with the engine shaft.

The invention claimed is—

1. An engine starting crank having an engaging pin with a seat for a spring formed thereon, the shank of said crank provided with a handle and having rotary connection with said pin, and a spring attached to said shank and resting directly in said seat, substantially as set forth.

2. An engine starting crank consisting of a pin having a flattened side at its outer end, the crank shank journaled upon said end, and a plate spring attached to said shank and bearing at its free end on said flattened side.

3. An engine starting crank consisting of a pin having a flattened side at its outer end, the crank shank bifurcated and journaled upon the outer end of said pin or socket straddling of the flattened portion, a plate spring attached to the shank in the fork thereof and bearing at its free end on said flattened portion, and a set screw bearing upon said spring for the purpose set forth.

In testimony whereof I affix my signature.

ARTHUR E. MILLER.

Copies of this patent may be obtained for five cents each, by addressing the "Commissioner of Patents, Washington, D. C."